United States Patent
Achalla et al.

(10) Patent No.: US 9,865,029 B2
(45) Date of Patent: Jan. 9, 2018

(54) CONTEXTUAL RENDERING OF PROCESS GRAPHICS

(71) Applicant: YOKOGAWA ELECTRIC CORPORATION, Musashino-shi (JP)

(72) Inventors: Srinivasu Achalla, Singapore (SG); Surendra Ramarao, Singapore (SG)

(73) Assignee: YOKOGAWA ELECTRIC CORPORATION, Musashino-shi (JP)

( * ) Notice: Subject to any disclaimer, the term of this patent is extended or adjusted under 35 U.S.C. 154(b) by 0 days.

(21) Appl. No.: 15/091,942

(22) Filed: Apr. 6, 2016

(65) Prior Publication Data

US 2017/0293993 A1 Oct. 12, 2017

(51) Int. Cl.
*G05B 23/02* (2006.01)
*G06T 1/20* (2006.01)

(52) U.S. Cl.
CPC ............ *G06T 1/20* (2013.01); *G05B 23/0272* (2013.01); *G05B 2219/24103* (2013.01); *G05B 2219/24123* (2013.01)

(58) Field of Classification Search
None
See application file for complete search history.

(56) References Cited

U.S. PATENT DOCUMENTS

| | | | |
|---|---|---|---|
| 6,167,394 A * | 12/2000 | Leung | G06F 17/30241 |
| 7,424,378 B2 | 9/2008 | Rieger | |
| 9,024,955 B2 | 5/2015 | Ramarao et al. | |
| 2004/0204849 A1* | 10/2004 | Shipley | G01C 21/36 701/455 |
| 2013/0021355 A1* | 1/2013 | Ramarao | G05B 23/0272 345/531 |
| 2013/0024542 A1 | 1/2013 | Keller et al. | |
| 2013/0262475 A1* | 10/2013 | Barak | G06Q 10/06311 707/748 |
| 2014/0047064 A1 | 2/2014 | Maturana et al. | |
| 2014/0074273 A1 | 3/2014 | Mohideen et al. | |
| 2015/0067017 A1* | 3/2015 | Shah | H04L 65/4084 709/202 |
| 2015/0186119 A1 | 7/2015 | Chouinard et al. | |

FOREIGN PATENT DOCUMENTS

WO 2014/151574 A1 9/2014

* cited by examiner

*Primary Examiner* — Joni Richer
(74) *Attorney, Agent, or Firm* — Oblon, McClelland, Maier & Neustadt, L.L.P.

(57) ABSTRACT

Contextual rendering systems, methods, and computer-readable media include circuitry configured to parse a graphics file into a plurality of graphics objects, determine whether one or more dynamic behavior attributes are present for each graphics object, extract at least one tag name for each graphics object having the one or more dynamic behavior attributes, assign an attribute weight to each dynamic behavior attribute, compute a sum of the attribute weights for each tag name-graphics object combination, rank each of the tag name-graphics object combinations according to the respective computed sum, and display a portion of a graphics view of one or more graphics objects for a first-ranked tag name-graphics object combination in context with other graphics objects.

20 Claims, 12 Drawing Sheets

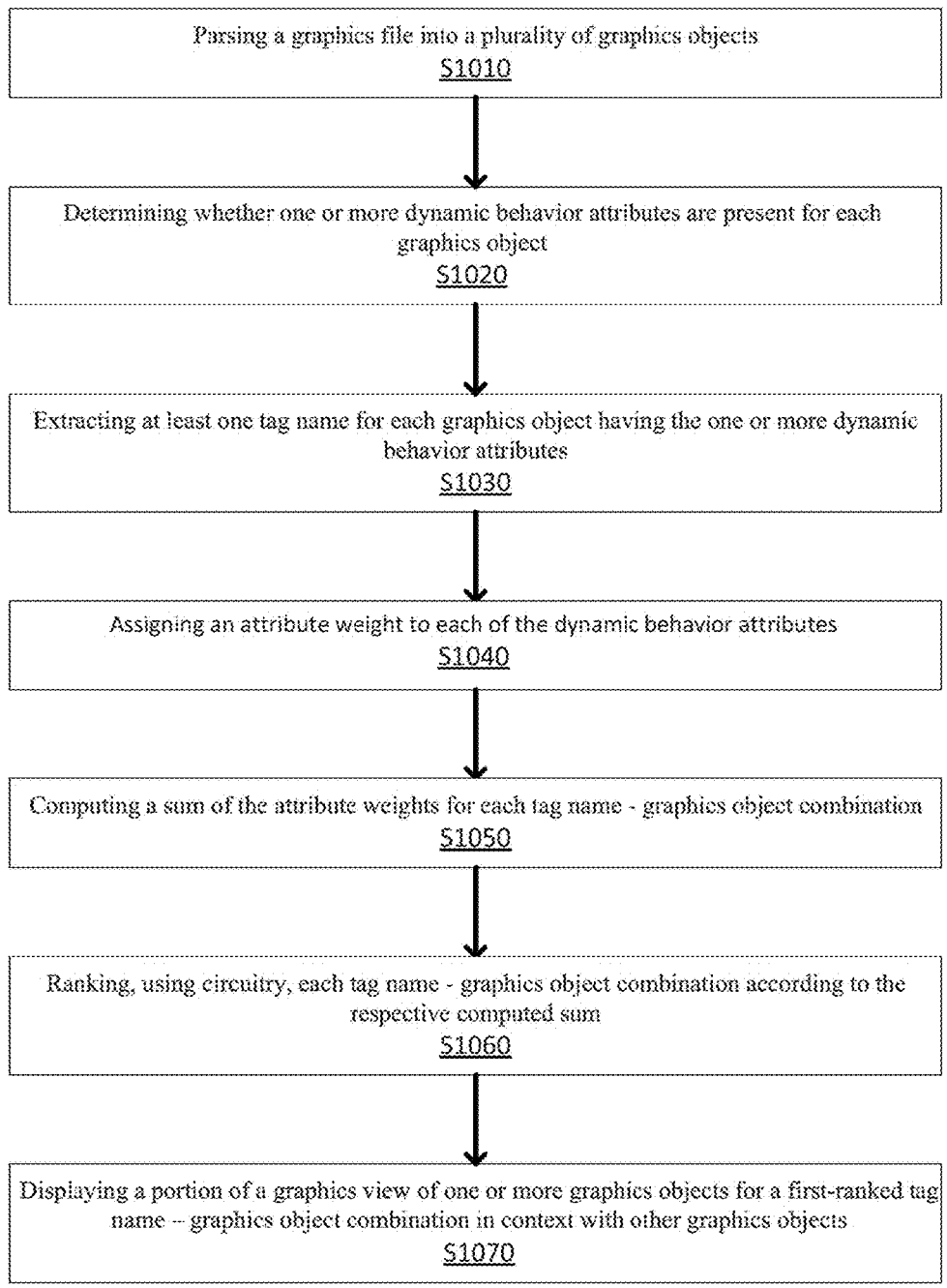

CONTEXTUAL RENDERING OF PROCESS GRAPHICS

BACKGROUND

Industrial automation systems can include input and output modules, industrial controllers, Human Machine Interfaces (HMIs), and a control network used for communication. It can also include one or more engineering stations used for configuring the entire system, including HMIs and industrial controllers.

The industrial controller is a device that performs process control. It has various types of function blocks that execute control calculations and the input/output functions, such as the process input/output and the software input/output.

Conventional systems and methods or function blocks perform input processing, calculation processing, and output processing in sequence for an input signal read from the input terminal, and writes an output signal from the output terminal. It also performs alarm processing when an abnormality is detected in input, calculation, or output. Each function block that is configured to be used in an industrial controller has an associated tag name.

Most abnormalities in the plant have an associated alarm. Alarms can be of two types, such as a process alarm and a system alarm. Process alarms originate from the industrial controller. The industrial controller detects an abnormality in the process from values, such as the process variable (PV) and a manipulated output value (MV), and reflects this in the function block alarm status. At the same time, the industrial controller consolidates the detection results and gives notification of these to the HMI (operation and monitoring function) as a message. Alarm processing is found in each function block.

The alarm generated from a function block can have a different status, such as input open (IOP+, IOP−), input error (BAD), input high or low (HH, HI, LO, LL), input velocity (VEL+, VEL−), deviation alarm (DV+, DV−), output open (OOP), output high and output low (MHI, MHL), and bad connection (CNF). The system alarm notifies an operator of an abnormality in the hardware and communication errors. The alarm processing level can be designated for each tag name. The alarms originating from the function block have a designated priority (for example, high, medium, or low). An importance level for each tag name can be specified for example, as important, general, or auxiliary.

The HMI system used in industrial automation usually presents the information to operating personnel graphically in the form of graphics pages (also called process graphics, graphics views, or mimic diagrams). The operator can see a schematic representation of the plant being controlled. For example, a picture of a pump connected to a pipe can illustrate to the operator that the pump is running and how much fluid is pumping through the pipe at the moment. The operator can switch the pump off, if desired. The HMI system shows the flow rate of the fluid in the pipe in real time.

Graphics pages can include line graphics and schematic symbols to represent process elements, or digital photographs of the process equipment overlain with animated symbols. The elements of a graphics page are generally referred to as graphics objects. Graphics objects can be configured to show the process value by associating them with corresponding process tag names. They can also be configured to show the alarm status of associated tag names.

The "background" description provided herein is for the purpose of generally presenting the context of the disclosure. Work of the presently named inventors, to the extent it is described in this background section are neither expressly nor impliedly admitted as prior art against the present invention. In addition, aspects of the description which may not otherwise qualify as prior art at the time of filing are neither expressly nor impliedly admitted as prior art against the present disclosure.

SUMMARY

Embodiments described herein provide an optimal and contextual viewing experience for mobile device users in which there is limited screen real estate. Zooming, panning, and scrolling are minimized to provide faster and more efficient results. Re-engineering of existing process graphics is not necessary to achieve the improved rendering described herein. Instead, image-based dynamic and static contextual rendering for mobile devices is achieved. This provides faster navigation to other points of interest within the same graphics file or in other graphics files ranked by relevance.

Embodiments include a contextual rendering system comprising circuitry configured to parse a graphics file into a plurality of graphics objects, determine whether one or more dynamic behavior attributes are present for each graphics object, extract at least one tag name for each graphics object having the one or more dynamic behavior attributes, assign an attribute weight to each dynamic behavior attribute, compute a sum of the attribute weights for each tag name-graphics object combination, rank each of the tag name-graphics object combinations according to the respective computed sum, and display a portion of a graphics view of one or more graphics objects for a first-ranked tag name-graphics object combination in context with other graphics objects.

The foregoing paragraphs have been provided by way of general introduction, and are not intended to limit the scope of the following claims. The described embodiments, together with further advantages, will be best understood by reference to the following detailed description, taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 is a flowchart of an exemplary method of contextually rendering graphics according to an embodiment.

DETAILED DESCRIPTION OF THE EMBODIMENTS

Figure 1:
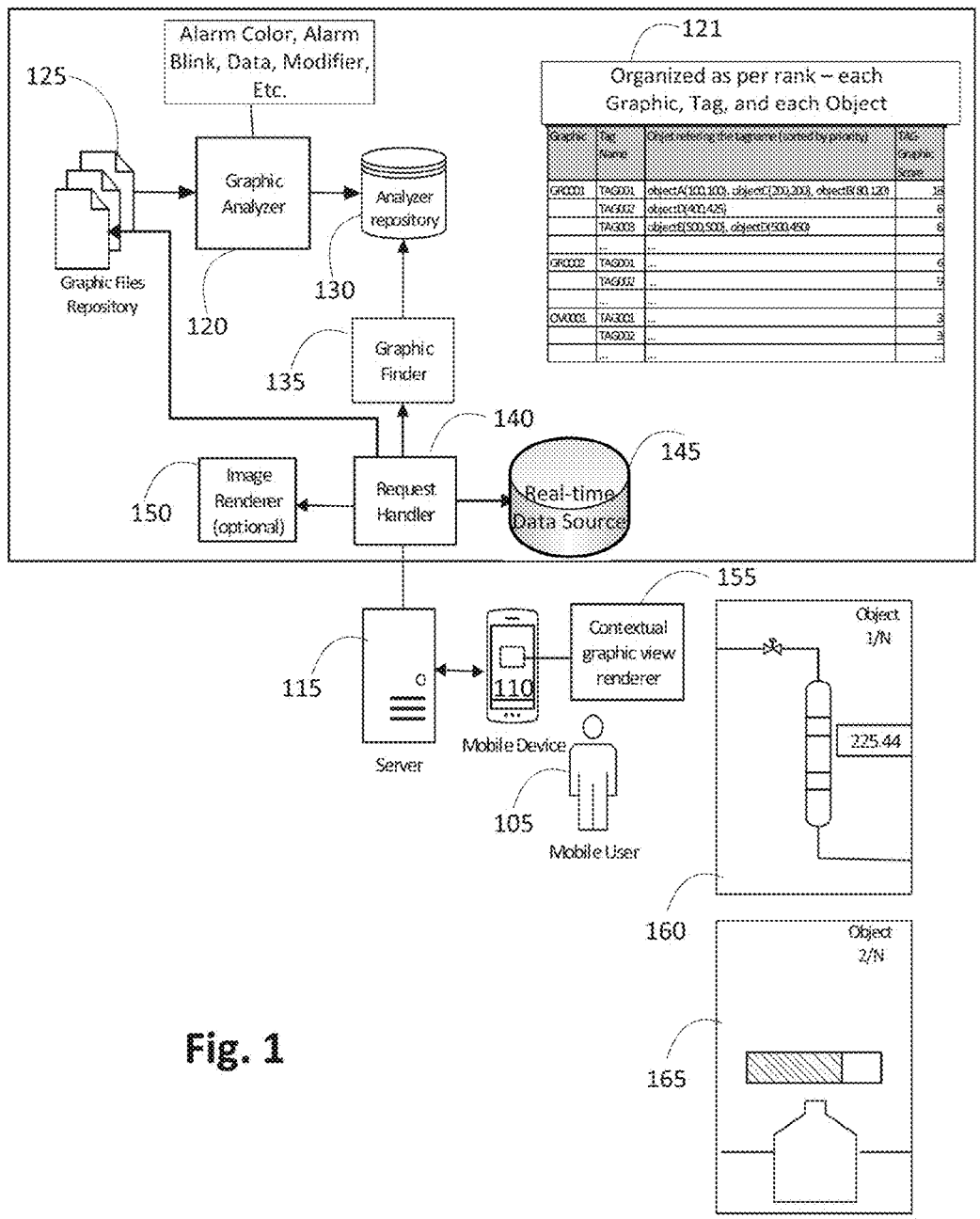
FIG. 1 illustrates an overview of an exemplary contextual rendering process graphics system according to an embodiment.

Embodiments described herein provide contextual rendering of a graphics file, wherein contextual rendering is a method in which to display graphics in a limited display-screen size. This can be achieved by selecting a particular graphics object, which will depend upon the limited display-screen size. For example, a contextual graphics object for display on a smart phone may be different from a contextual graphics object for display on a tablet device. As a result, an automated zoom of the contextual graphics area is displayed on the mobile device, wherein the selected contextual area is based upon a score of dynamic behavior attributes of each graphics object, position of the graphics objects, and the mobile device screen size. When the behavior of an attribute is dynamic, the attribute is a dynamic attribute.

A graphics file usually has more than one graphics object, wherein a graphics object is an element within a graphics page. Each graphics object has a plurality of attributes, such as data display, alarm color change, and alarm blinking. Graphics objects can have more than one attribute.

A graphics analyzer is configured to extract tag names for the attributes. A tag name is an identifier for values in an industrial automation system. Examples of values include, but are not limited to a process value from a field device wherein the process value is a raw value from the field device or historian, a value calculated in a function block or an industrial controller, and a tuning parameter used for calculation in a function block or an industrial controller.

Each attribute has a pre-defined customizable weight assigned to it. A higher weighting is assigned to graphics objects that have a data display attribute in order to best visualize the given tag name. Other attributes, such as an alarm or modifier are given a lower weighting. A total score is computed for each graphics object-tag name combination. The total score is computed for each tag name of the graphics object based upon the relative weight of all of its attributes.

Coordinates of the graphics objects of the graphics file are extracted. The graphics objects are sorted based upon their total scores. When more than one graphics object for a given tag name has the same total score, the graphics objects are sorted based upon their relative location from the top and left of the graphics file, which are determined from their respective coordinates.

Based upon a user selection of a particular tag name or tag names, a portion of a specific graphics view containing the specific graphics objects associated with those tag name(s) is displayed, such that the displayed image fits the given screen size. This provides an optimum visual display of graphics data for the selected tag name(s) of interest to a user. Since the complete graphics view is not rendered, this avoids the need for pinch and zoom actions and/or to navigate to find the relevant graphics portion(s). The graphics analyzer computes the score for each graphics object-tag name combination. In addition, the graphics analyzer sorts the graphics objects based upon their relative coordinate positions in the graphics view.

When a primary graphics object is displayed, one or more additional associated graphics objects can also be displayed. In an example, if there is a nearby label text displaying the tag name, the tag name can also be included along with the primary graphics object.

Input from other analyses can be used to identify a most likely cause of an alarm and subsequently allow a user to navigate to the associated graphics objects. In an example, control drawing files could be analyzed to identify related process tag names for a current process tag name and alarm. The user would be allowed or directed to navigate into the corresponding graphics objects.

FIG. 1 illustrates an exemplary overview of a contextual rendering process graphics system according to an embodiment. A mobile user 105 initiates a request to display graphics for a tag name of interest on a mobile device 110. Mobile device 110 has a display screen and network communication capability, such as that for a smart phone or a tablet mobile device. A software application resides on the mobile device 110, which is capable of displaying the requested graphics and/or features for browsing or navigation. A server 115 transmits the request(s) received from the mobile device 110.

A graphics file analyzer 120 is configured to analyze graphics content within graphics files of a graphics file repository 125. Graphics file analyzer 120 identifies a tag name and an associated graphics object within a graphics file and computes a score for each graphics object-tag name combination, based on pre-defined rules. The identification can be made per pre-established criteria, such as an alarm color, an alarm blink, a data display, or a modifier. Graphics file analyzer 120 computes a total score for each graphics file-tag name combination, which is obtained by combining all of the graphics object scores for a given tag name. Table 121 illustrates graphics files, their associated tag name, the one or more graphics objects identified for each tag name, and a combined graphics object score for each tag name. The resulting information is stored in an analyzer repository 130. A graphics analyzer process is described in more detail herein with reference to FIG. 2.

In FIG. 1, a graphics finder 135 is configured to identify a graphics file from graphics file repository 125, which is configured in one or more graphics-file formats. Graphics finder 135 identifies a graphics file based on a tag name, and sorts and ranks relevant graphics files based upon the previously computed scores. A request handler 140 is configured to receive a forwarded request by the server 115 from mobile device 110. The request handler 140 is configured to forward the request to a real-time data source 145 and/or an image renderer 150.

A contextual graphics view renderer 155 is displayed upon the screen of mobile device 110. For a particular identified graphic, a displayed graphics view corresponds to the ranked objects within the associated graphics file. The rendering can be controlled based upon the display screen size of mobile device 110 and other mobile device capabilities. A first display inset 160 of the contextual graphics view renderer 155 illustrates a reactor and associated metric, such as a current temperature or flow rate. A second display inset 165 of the contextual graphics view renderer 155 illustrates a furnace and associated metrics, such as temperature, pressure, and flow rate.

Figure 2:
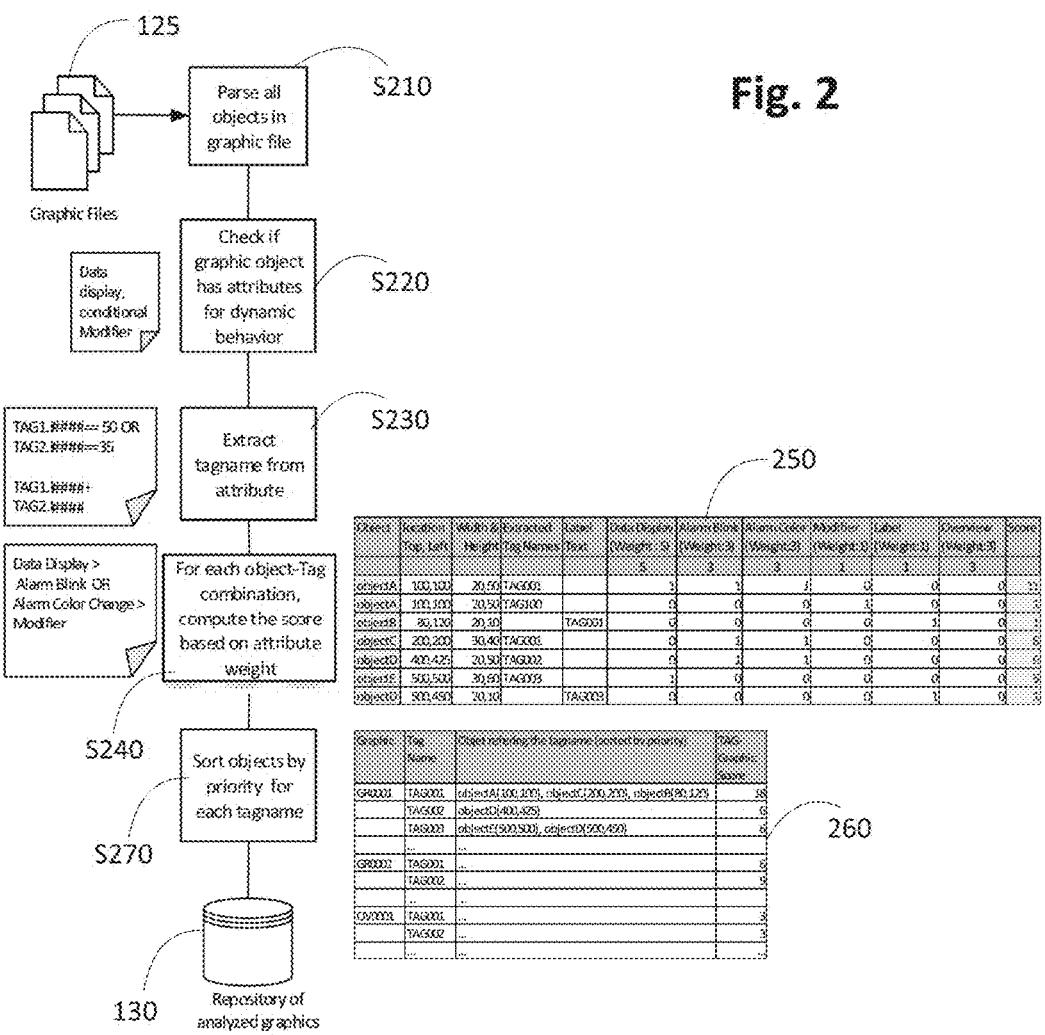
FIG. 2 illustrates an exemplary graphics analyzer process according to an embodiment.

FIG. 2 illustrates an exemplary graphics analyzer process according to an embodiment. Graphics file analyzer 120 parses each graphics file in step S210. One or more graphics objects having attributes related to dynamic behavior, such as data display or a conditional modifier are identified in step S220. Tag names defined in the graphics object attributes are extracted in step S230. For each graphics object-tag name combination, a score is computed based upon a customizable weight assigned to each type of attribute in step S240. Table 250 illustrates some exemplary attributes and their associated assigned weights. For example, a data display attribute has an assigned weight of five, an alarm blink attribute has an assigned weight of three, an alarm color attribute has an assigned weight of three, a modifier attribute has an assigned weight of one, a label attribute has an assigned weight of one, and an overview attribute has an assigned weight of three. However, many other attributes and associated assigned weights are contemplated for multiple types of industries by embodiments described herein.

Each graphics object can be associated with multiple attributes, as illustrated in Table 250. For a given graphics object-tag name combination, the total score is computed with respect to the relative assigned weights for all attributes.

For each graphics file, tag names are indexed with reference to each graphics object and its location, as illustrated in Table 260. Graphics objects are sorted based upon their priority score in step S270. If two or more graphics objects exist for a given tag name with the same score, they are sorted based upon their relative location from the top and left of the graphics file. However, other location systems and methods are contemplated by embodiments described herein. The location of each object is illustrated in the second column of Table 250. A total score is computed for each tag name of each graphics file, as illustrated in Table 260. Results are stored in the analyzer repository 130.

Calculations are made from a tag name point of view. Computations are based on a tag name, tag name-graphics object, and tag name-graphics file. One tag name can have multiple attributes, hence multiple attributes can have the same tag name as illustrated in Table 250 of FIG. 2.

Figure 3A:
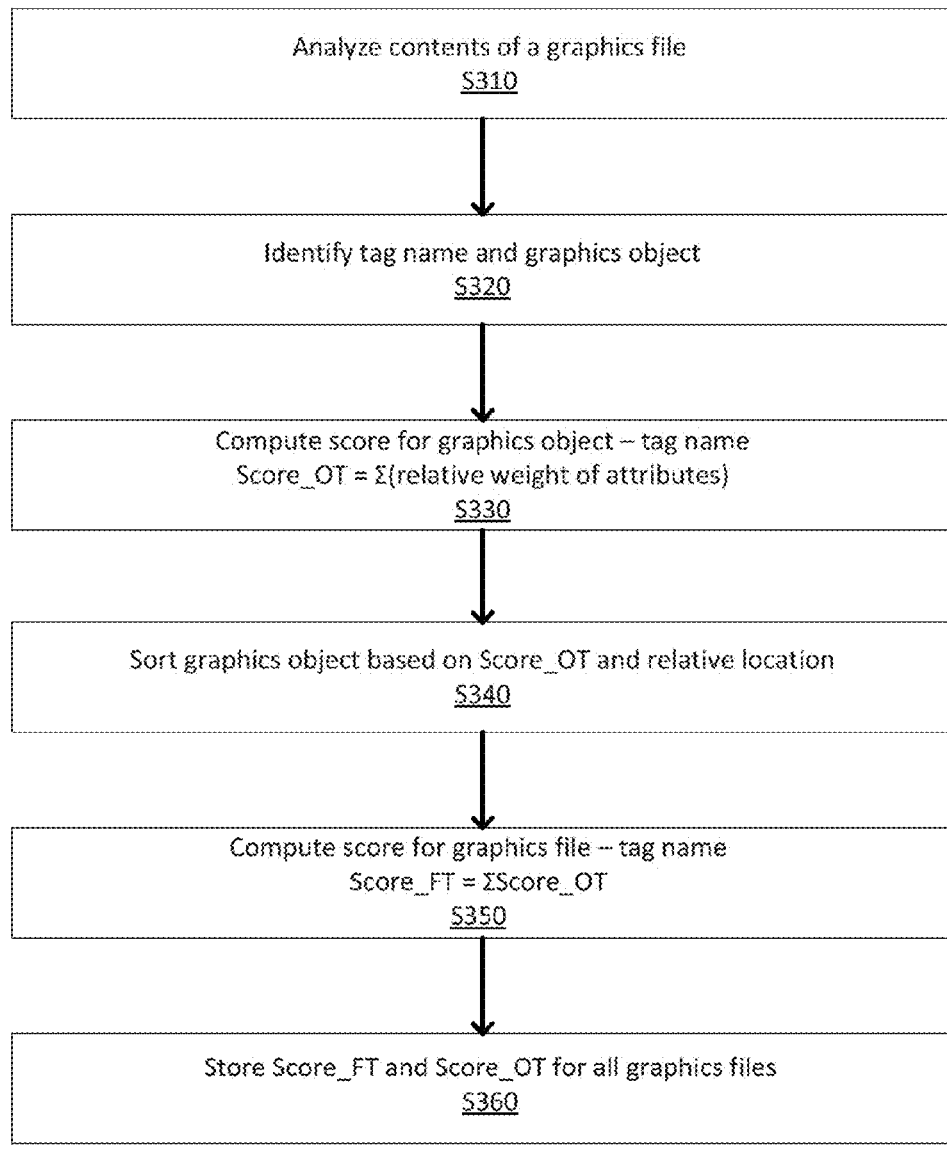
FIG. 3A illustrates an exemplary flowchart for analyzing graphics according to an embodiment.

FIG. 3A illustrates an exemplary flowchart for analyzing graphics. Contents of a graphics file are analyzed in step S310. Results are stored in the analyzer repository HO, which includes mapping between each process tag name and a graphics object in a process graphics file in step S320. The location of the graphics objects visualizes associated process data from the associated process tag name. Repository results can be stored on the server side, such as server 115. However, repository results can be stored elsewhere within the contextual rendering process graphics system, or repository results can be stored external of the contextual rendering process graphics system. External storage can include, but is not limited to a central processor, server, and/or storage system in another location, or storage via a cloud computing environment.

Scores are computed for all attributes of a graphics object-tag name combination (Score_OT) in step S330. A sum of all relative assigned attribute weights is calculated as Score_OT=Σ(relative assigned attribute weights)

The graphics objects are sorted in step S340 based upon their respective Score_OT and based upon their relative locations. Graphics file-tag name combinations (Score_FT) are identified in step S350, wherein Score_FT=ΣScore_OT Results of all Score_FT and Score_OT for all graphics files are stored in the analyzer repository 130 in step S360.

In an embodiment, the graphic objects for each graphic file are sorted based on Score_OT. The graphic objects are stored based on the sorted results.

Figure 3B:
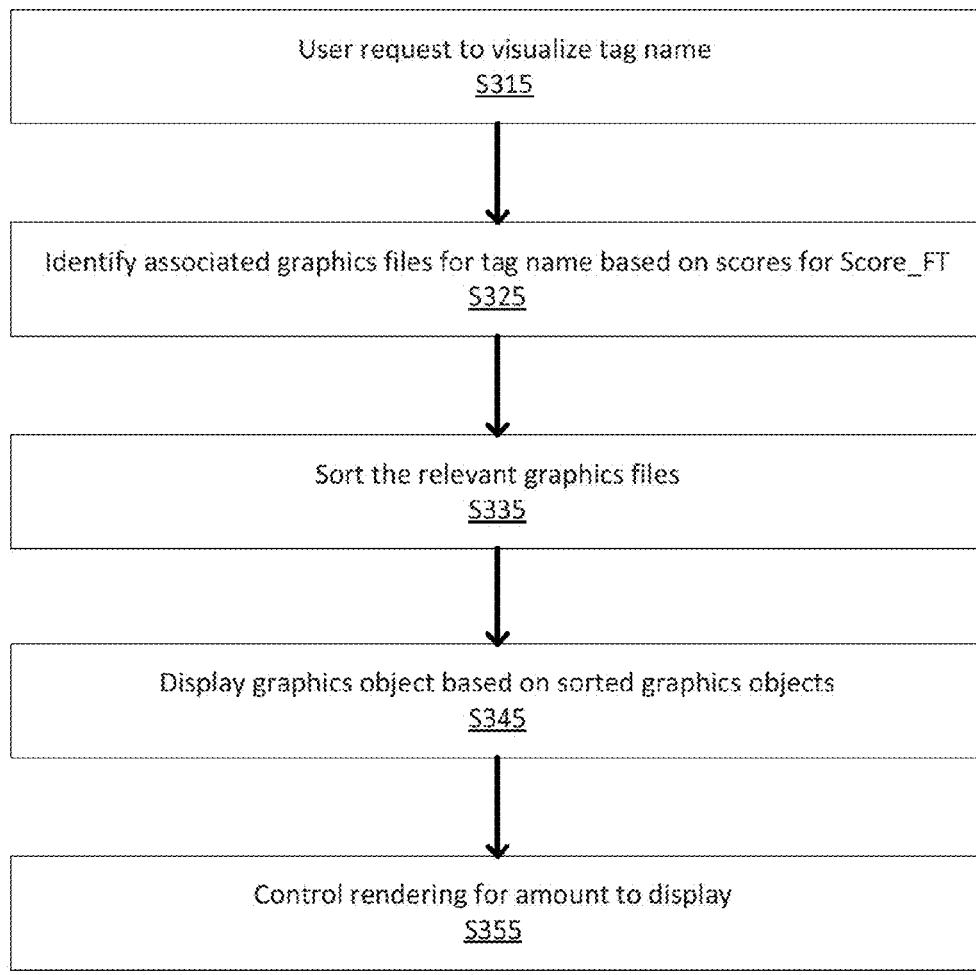
FIG. 3B illustrates an exemplary flowchart for retrieving and displaying contextual graphics according to an embodiment.

FIG. 3B illustrates an exemplary flowchart for retrieving and displaying contextual graphics. A mobile device user, such as mobile user 105 may receive a notification of an abnormality, such as a process alarm on a mobile device, such as mobile device 110. The mobile user 105 can request associated process graphics for viewing on the mobile device 110, or the mobile user 105 can request a tag name for an associated process graphic to identify the cause of the alarm. After receiving the process tag name associated with the alarm (or other notification), a mobile device application on the mobile device 110 requests process graphics information from the server 115 to visualize graphics associated with the tag name in step S315. The server 115 identifies the process graphics files from the graphics repository 125 to be displayed and also provides the coordinates of the user's point of interest around the graphics objects to be visualized in step S325. In another embodiment, graphics files associated with the tag name are identified by a graphics finder, such as graphics finder 135 based upon scores for Score_FT. The relevant graphics files are sorted in step S335. The highest ranked graphic file is selected. The graphic objects in the selected graphic file are sorted based on scores for Score_OT when the graphic objects are not sorted before being stored.

In step S345, the sorted graphics objects are displayed via a contextual graphics view renderer. Using the repository data from the analyzer repository 130, one or more graphics objects from identified process graphics files are displayed to the user, along with the coordinates of the user's point of interest contextually surrounding the graphics objects for the given process tag name. Process graphics with real-time data can be rendered and periodically updated on a client side to optimally focus on coordinate information provided by server 115. Control for the graphics display can be adjusted for a zoom level or other display factors accordingly in step S355. Mobile user 105 can navigate to the next best possible graphics object or graphics file within a given context efficiently and with minimal zooming or panning.

Figure 4A:
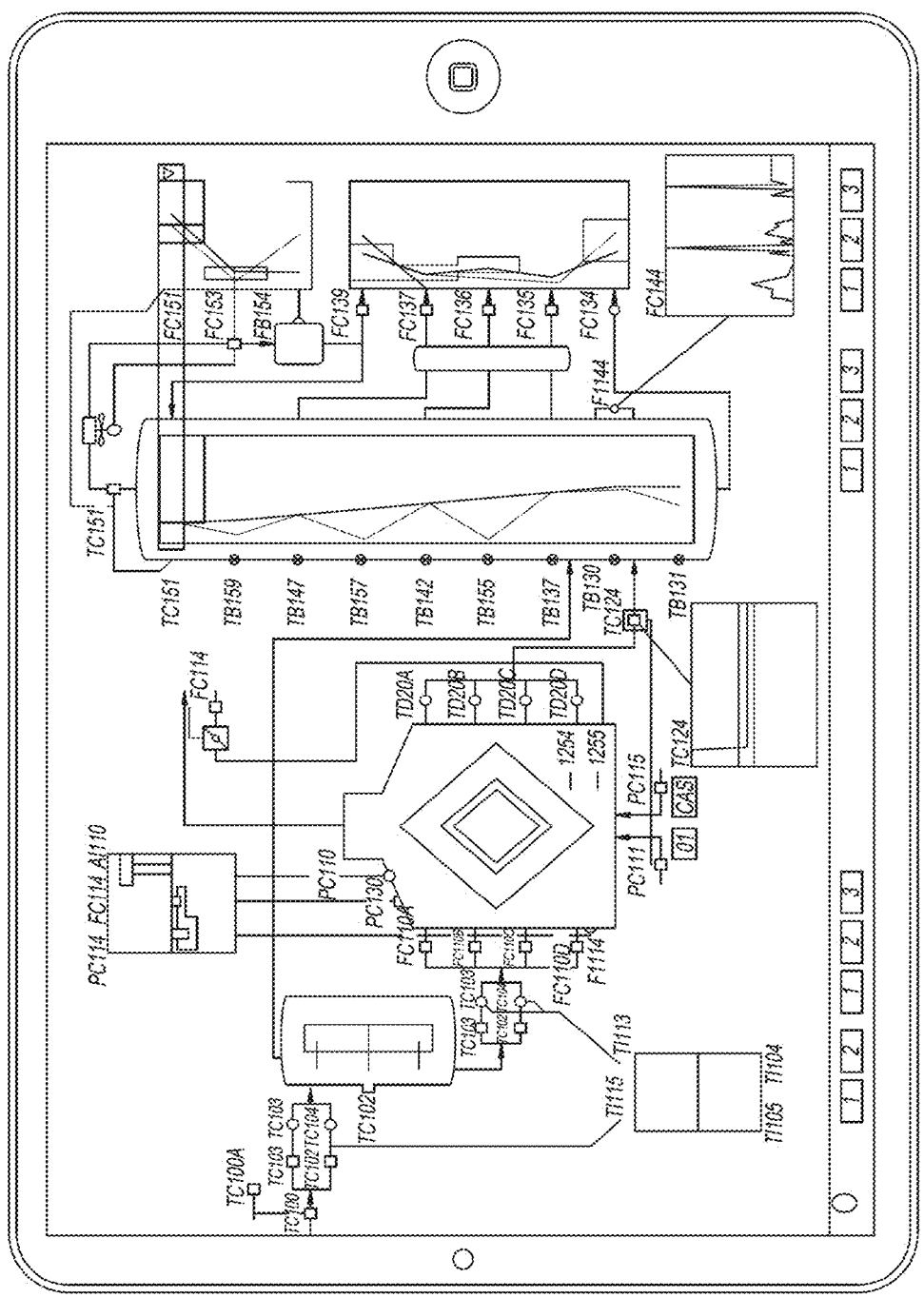
FIG. 4A illustrates a screen display of a full rendering of a graphics file according to an embodiment.
Figure 4B:
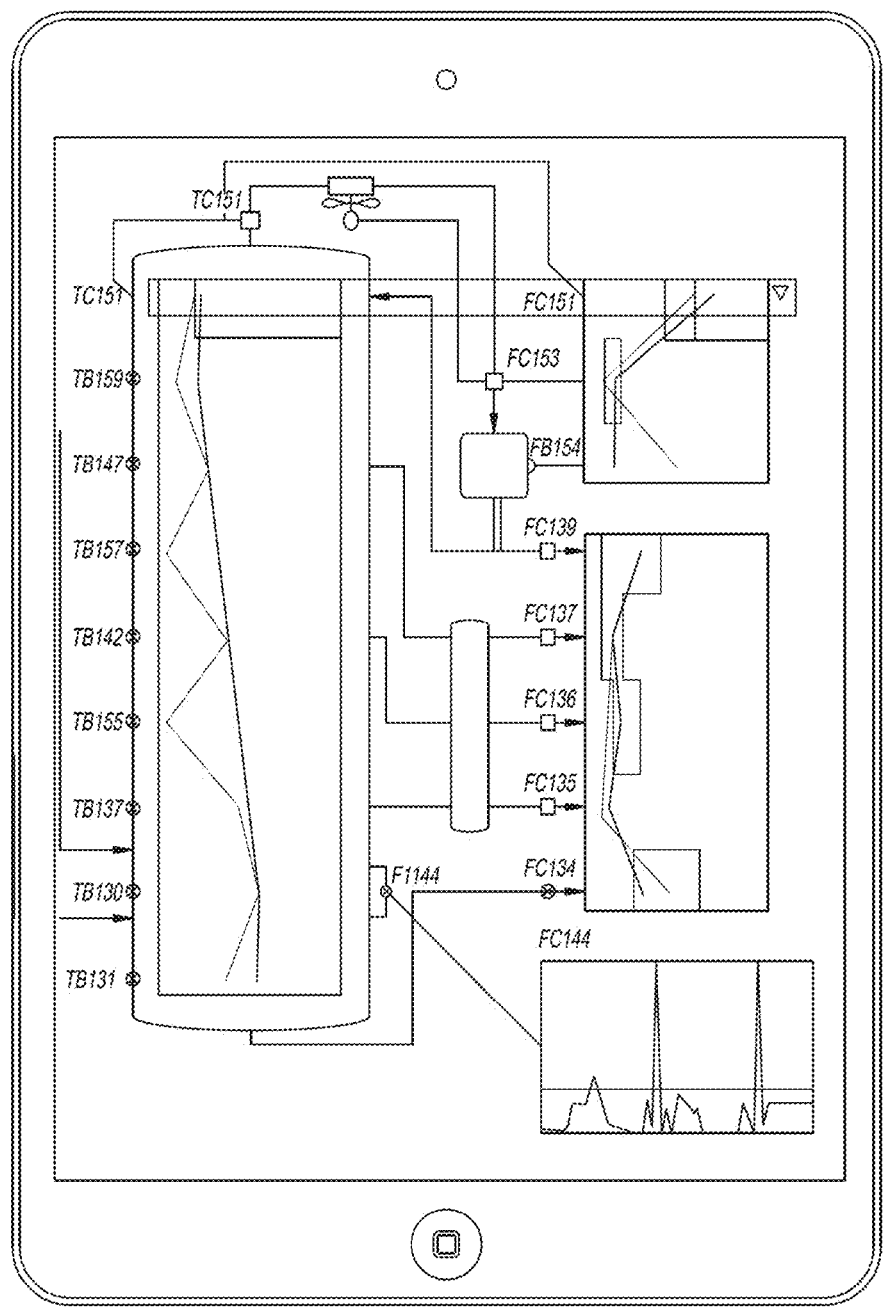
FIG. 4B illustrates a screen display of a contextual rendering of the graphics file according to an embodiment.

FIG. 4A illustrates a screen display of a full rendering of a graphics file. The illustrated screen display could be rendered on a tablet mobile device. FIG. 4B illustrates a screen display of a contextual rendering of the graphics file. The attributes of each graphics object within the graphics file have been assigned weights based upon their displayed importance. The assigned attribute weights have been computed and sorted by priority and location for each graphics object-tag name combination. As a result, the most relevant graphics objects of a graphics file are selected for display as a contextual area around the graphics object. In FIG. 4B, the contextual area was selected using embodiments described herein for approximately 40% of the right portion of the full rendering of FIG. 4A.

Figure 5A:
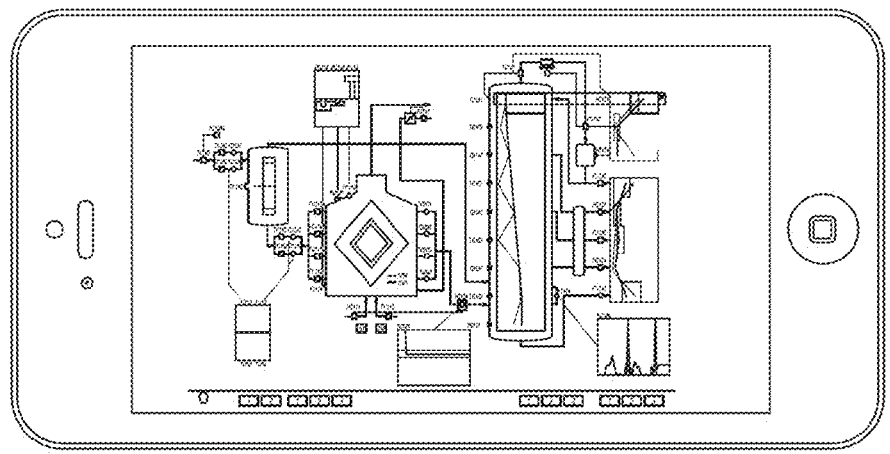
FIG. 5A illustrates a screen display of the same full rendering of the graphics file according to an embodiment.
Figure 5B:
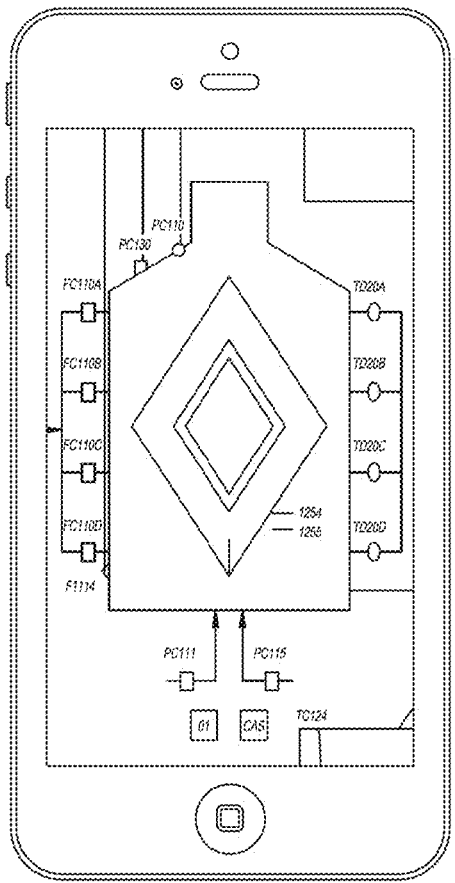
FIG. 5B illustrates a screen display of a contextual rendering of the graphics file according to an embodiment.

FIG. 5A illustrates a screen display of the same full rendering of the graphics file of FIG. 4A. However, the full rendering of FIG. 5A is displayed on a smaller device, such as a smart phone. FIG. 5A illustrates how small the display details can be for a full rendering, which would likely require zooming and/or panning to find an area of interest. FIG. 5B illustrates a screen display of a contextual rendering of the graphics file. Using embodiments described herein, FIG. 5B has displayed a different portion of the full rendering for a contextual rendering, based upon computations for contextual graphics objects and properties of the smaller mobile device.

Weights of attributes can be pre-determined as default values. Alternatively, weights of attributes can be customized according to one or more user inputs. In an example, a default tag name may be considered a high priority in terms of data display. However, a user input can designate one or more other attributes as a high priority. The customized user input can be a permanent designation, a timed designation, or a use-case designation.

In an embodiment, one or more graphics objects can be hidden or suppressed by a user input to allow the user to navigate to graphics objects of interest more quickly. The graphics object suppression can be a permanent designation, a timed designation, or a use-case designation.

In certain situations, a mobile device may not be capable of rendering and/or updating certain process graphics. Therefore, the rendering can be executed on the server side, and images can be sent to the mobile device for periodic rendering only.

After the graphics analyzer 120 computes the score for each graphics object-tag name combination, the score usually remains the same until it is recomputed. The score is recomputed when there is change in a configuration or settings update. Examples of a change include a change in dynamic attributes for a graphics object and attribute weight. When a tag name of interest is inputted, the top-ranked graphics file is retrieved from the graphics file repository 125 and relevant graphics objects from the graphics file are displayed according to an available screen space of the mobile device.

In an embodiment, the computed score is based upon a tag name importance or alarm definition, such as priority or status. However, in other embodiments, the score is based on an assigned weight factor for each graphics object, such as a modifier or data display. The graphics objects are further sorted by their coordinate positions.

Embodiments described herein can be implemented via one or more HMIs configured to continuously monitor process graphics. However, embodiments described herein are advantageous for mobile users to view graphics conveniently on a mobile device while away from a central control room.

In an embodiment, one or more graphics objects in close vicinity to a displayed graphics object are selected, based upon a relative distance from the displayed graphics object and based on an available screen size of the mobile device. In another embodiment, one or more graphics objects can be selected based upon grouping information of the graphics objects. The grouping information of the graphics objects can be available from contents of the graphics file repository 125, configured during engineering of the graphics objects.

Figure 6:
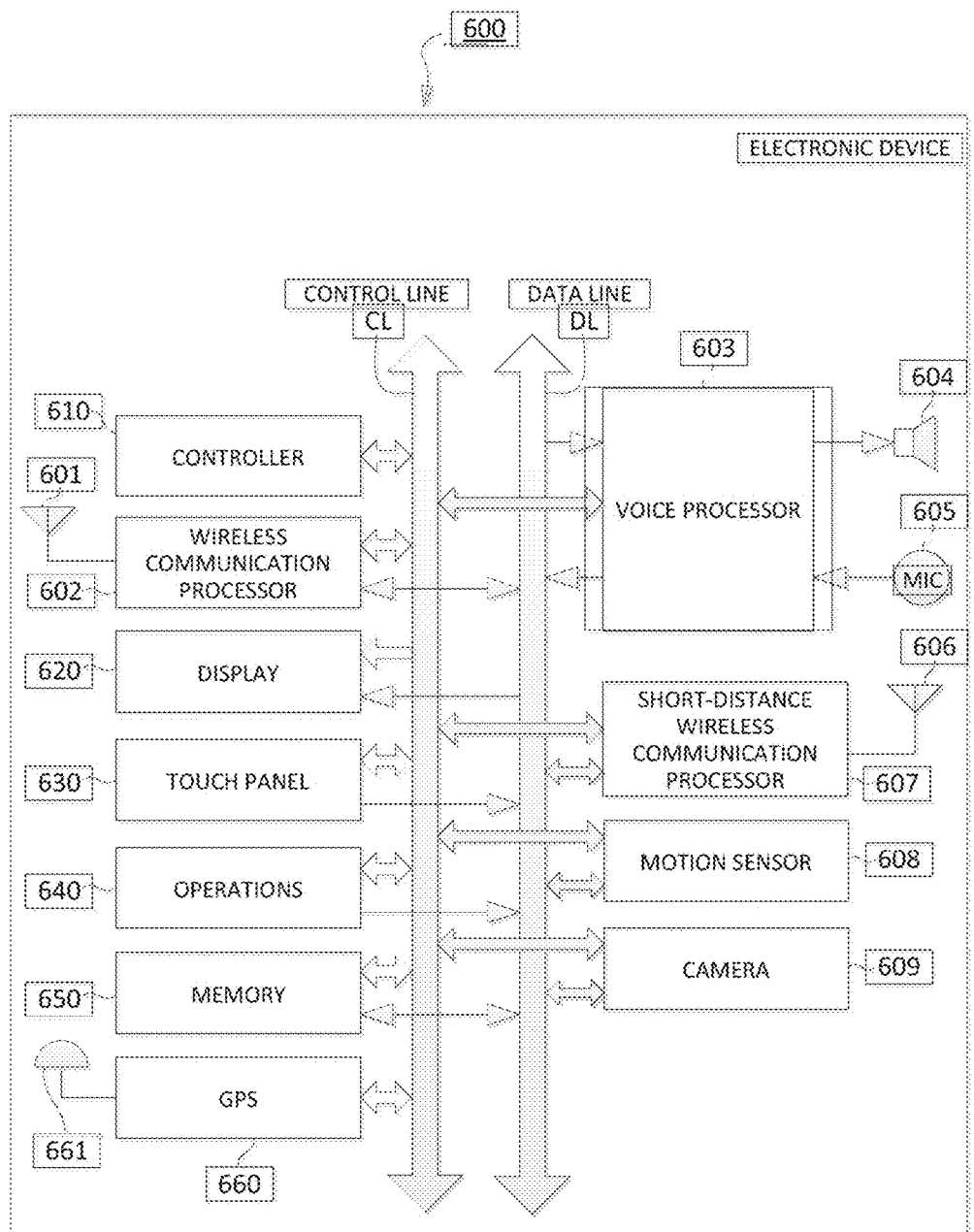
FIG. 6 is a block diagram illustrating an exemplary electronic device according to an embodiment.

FIG. 6 is a block diagram illustrating an exemplary electronic device 600 that could be used to implement one or more embodiments of the present disclosure, such as mobile device 110 and/or any of the mobile devices illustrated in FIGS. 4A, 4B, 5A, and 5B. In some embodiments, electronic device 600 can be a smartphone. In other embodiments, electronic device 600 can be a laptop, a tablet, a server, an e-reader, a camera, a navigation device, etc.

The exemplary electronic device 600 of FIG. 6 includes a controller 610 and a wireless communication processor 602 connected to an antenna 601. A speaker 604 and a microphone 605 are connected to a voice processor 603. The controller 610 can include one or more central processing units (CPUs), and can control each element in the electronic device 600 to perform functions related to communication control, audio signal processing, control for the audio signal processing, and other kinds of signal processing. The controller 610 can perform these functions by executing instructions stored in a memory 650. Alternatively, or in addition to the local storage of the memory 650, the functions can be executed using instructions stored on an external device accessed on a network or on a non-transitory computer-readable medium.

The memory 650 includes but is not limited to Read Only Memory (ROM), Random Access Memory (RAM), or a memory array including a combination of volatile and non-volatile memory units. The memory 650 can be utilized as working memory by the controller 610 while executing the processes and algorithms of the present disclosure. Additionally, the memory 650 can be used for long-term storage, e.g., of image data and information related thereto.

The electronic device 600 includes a control line CL and data line DL as internal communication bus lines. Control data to/from the controller 610 can be transmitted through the control line CL. The data line DL can be used for transmission of voice data, display data, etc.

The antenna 601 transmits/receives electromagnetic wave signals between base stations for performing radio-based communication, such as the various forms of cellular telephone communication. The wireless communication processor 602 controls the communication performed between the electronic device 600 and other external devices via the antenna 601. For example, the wireless communication processor 602 can control communication between base stations for cellular phone communication.

The speaker 604 emits an audio signal corresponding to audio data supplied from the voice processor 603. The microphone 605 detects surrounding audio and converts the detected audio into an audio signal. The audio signal can then be output to the voice processor 603 for further processing. The voice processor 603 demodulates and/or decodes the audio data read from the memory 650 or audio data received by the wireless communication processor 602 and/or a short-distance wireless communication processor 607. Additionally, the voice processor 603 can decode audio signals obtained by the microphone 605.

The exemplary electronic device 600 can also include a display 620, a touch panel 630, an operations key 640, and a short-distance communication processor 607 connected to an antenna 606. The display 620 can be a Liquid Crystal Display (LCD), an organic electroluminescence display panel, or another display screen technology. In addition to displaying still and moving image data, the display 620 can display operational inputs, such as numbers or icons which can be used for control of the electronic device 600. The display 620 can additionally display a GUI for a user to control aspects of the electronic device 600 and/or other devices. Further, the display 620 can display characters and images received by the electronic device 600 and/or stored in the memory 650 or accessed from an external device on a network. For example, the electronic device 600 can access a network such as the Internet and display text and/or images transmitted from a Web server.

The touch panel 630 can include a physical touch panel display screen and a touch panel driver. The touch panel 630 can include one or more touch sensors for detecting an input operation on an operation surface of the touch panel display screen. The touch panel 630 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus can include a conductive material at least at the tip of the stylus. The sensors included in the touch panel 630 can detect when the stylus approaches/contacts the operation surface of the touch panel display (similar to the case in which a finger is used for the touch operation).

According to aspects of the present disclosure, the touch panel 630 can be disposed adjacent to the display 620 (e.g., laminated) or can be formed integrally with the display 620. For simplicity, the present disclosure assumes the touch panel 630 is formed integrally with the display 620 and therefore, examples discussed herein describe touch operations being performed on the surface of the display 620 rather than the touch panel 630. However, the skilled artisan will appreciate that this is not limiting.

For simplicity, the present disclosure assumes the touch panel 630 is a capacitance-type touch panel technology. However, it should be appreciated that aspects of the present disclosure can easily be applied to other touch panel types (e.g., resistance-type touch panels) with alternate structures. According to aspects of the present disclosure, the touch panel 630 can include transparent electrode touch sensors arranged in the X-Y direction on the surface of transparent sensor glass.

The touch panel driver can be included in the touch panel 630 for control processing related to the touch panel 630, such as scanning control. For example, the touch panel driver can scan each sensor in an electrostatic capacitance transparent electrode pattern in the X-direction and Y-direction and detect the electrostatic capacitance value of each sensor to determine when a touch operation is performed. The touch panel driver can output a coordinate and corresponding electrostatic capacitance value for each sensor. The touch panel driver can also output a sensor identifier that can be mapped to a coordinate on the touch panel display screen. Additionally, the touch panel driver and touch panel sensors can detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. Signals can be transmitted by the touch panel driver, e.g. in response to a detection of a touch operation, in response to a query from another element based on timed data exchange, etc.

The touch panel 630 and the display 620 can be surrounded by a protective casing, which can also enclose the other elements included in the electronic device 600. According to aspects of the disclosure, a position of the user's fingers on the protective casing (but not directly on the surface of the display 620) can be detected by the touch panel 630 sensors. Accordingly, the controller 610 can perform display control processing described herein based on the detected position of the user's fingers gripping the casing. For example, an element in an interface can be moved to a new location within the interface (e.g., closer to one or more of the fingers) based on the detected finger position.

Further, according to aspects of the disclosure, the controller 610 can be configured to detect which hand is holding the electronic device 600, based on the detected finger position. For example, the touch panel 630 sensors can detect a plurality of fingers on the left side of the electronic device 600 (e.g., on an edge of the display 620 or on the protective casing), and detect a single finger on the right side of the electronic device 600. In this exemplary scenario, the controller 610 can determine that the user is holding the electronic device 600 with his/her right hand because the detected grip pattern corresponds to an expected pattern when the electronic device 600 is held only with the right hand.

The operation key 640 can include one or more buttons or similar external control elements, which can generate an operation signal based on a detected input by the user. In addition to outputs from the touch panel 630, these operation signals can be supplied to the controller 610 for performing related processing and control. According to aspects of the disclosure, the processing and/or functions associated with external buttons and the like can be performed by the controller 610 in response to an input operation on the touch panel 630 display screen rather than the external button, key, etc. In this way, external buttons on the electronic device 600 can be eliminated in lieu of performing inputs via touch operations, thereby improving water-tightness.

The antenna 606 can transmit/receive electromagnetic wave signals to/from other external apparatuses, and the short-distance wireless communication processor 607 can control the wireless communication performed between the other external apparatuses. Bluetooth, IEEE 802.11, and near-field communication (NFC) are non-limiting examples of wireless communication protocols that can be used for inter-device communication via the short-distance wireless communication processor 607.

The electronic device 600 can include a motion sensor 608. The motion sensor 608 can detect features of motion (i.e., one or more movements) of the electronic device 600. For example, the motion sensor 608 can include an accelerometer to detect acceleration, a gyroscope to detect angular velocity, a geomagnetic sensor to detect direction, a geo-location sensor to detect location, etc., or a combination thereof to detect motion of the electronic device 600. According to aspects of the disclosure, the motion sensor 608 can generate a detection signal that includes data representing the detected motion. For example, the motion sensor 608 can determine a number of distinct movements in a motion, a number of physical shocks on the electronic device 600, a speed and/or acceleration of the motion, or other motion features. The detected motion features can be included in the generated detection signal. The detection signal can be transmitted, e.g., to the controller 610, whereby further processing can be performed based on data included in the detection signal. The motion sensor 608 can work in conjunction with a GPS 660. The GPS 660 detects the present position of the electronic device 600. The information of the present position detected by the GPS 660 is transmitted to the controller 610. An antenna 661 is connected to the GPS 660 for receiving and transmitting signals to and from a GPS satellite.

Electronic device 600 can include a camera 609, which includes a lens and shutter for capturing photographs of the surroundings around the electronic device 600. In an embodiment, the camera 609 captures surroundings of an opposite side of the electronic device 600 from the user. The images of the captured photographs can be displayed on the display panel 620. A memory saves the captured photographs. The memory can reside within the camera 609 or it can be part of the memory 650. The camera 609 can be a separate feature attached to the electronic device 600 or it can be a built-in camera feature.

A hardware description of a computing device 700 used in accordance with exemplary embodiments is described with reference to FIG. 7. One or more features described above with reference to electronic device 600 of FIG. 6 can be included in computing device 700 described herein. Computing device 700 could be used to implement one or more embodiments of the present disclosure, such as graphics analyzer 120, graphics finder 135, image renderer 150, request handler 140, server 115, and/or contextual graphics view renderer 155.

Figure 7:
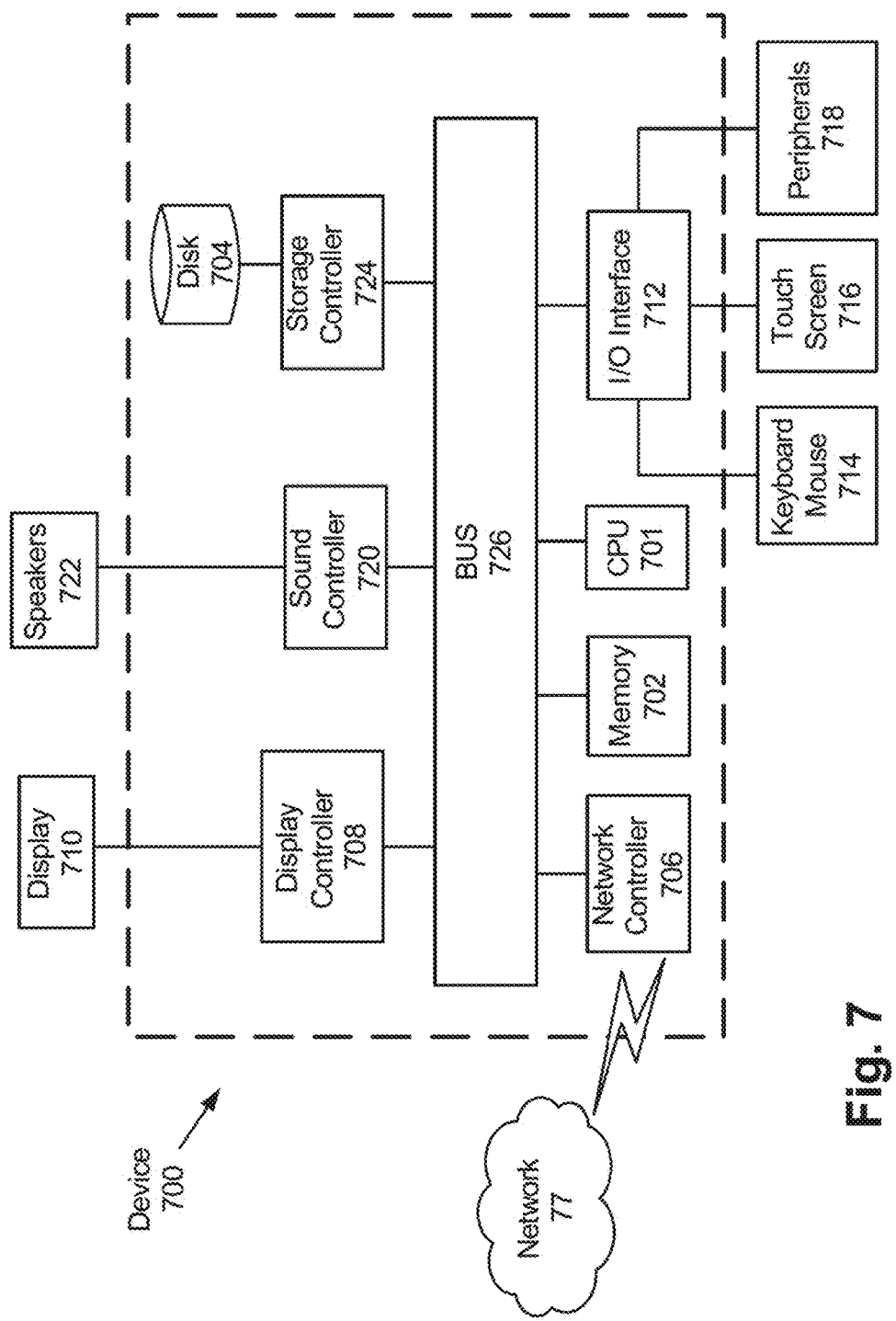
FIG. 7 is a block diagram illustrating an exemplary computing device according to an embodiment.

In FIG. 7, the computing device 700 includes a CPU 701 which performs the processes described herein. The process data and instructions may be stored in memory 702. These processes and instructions may also be stored on a storage medium disk 704 such as a hard disk drive (HDD) or portable storage medium or may be stored remotely. Further, the claimed embodiments are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed embodiments may be provided as a utility application, background daemon, or component of an operating system, or combination thereof, executing in conjunction with CPU 701 and an operating system. Examples of an operating system include Microsoft Windows 7, UNIX, Solaris, LINUX, Apple MAC-OS, and other systems known to those skilled in the art.

CPU 701 may be a Xenon or Core processor from Intel of America or an Opteron processor from AMD of America, or may be other processor types that would be recognized by one of ordinary skill in the art. Alternatively, the CPU 701 may be implemented on an FPGA, ASIC, PLD or using discrete logic circuits, as one of ordinary skill in the art would recognize. Further, CPU 701 may be implemented as multiple processors cooperatively working in parallel to perform the instructions of the inventive processes described above.

The computing device 700 in FIG. 7 also includes a network controller 706, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN sub-networks. The network 77 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device 700 further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface 712 also connects to a variety of peripherals 718 including printers and scanners, such as an OfficeJet or DeskJet from Hewlett Packard. A sound controller 720 is also provided in the computing device, such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device 700. A description of the general features and functionality of the display 710, keyboard and/or mouse 714, as well as the display controller 708, storage controller 724, network controller 706, sound controller 720, and general purpose I/O interface 712 are omitted herein for brevity.

Figure 8:
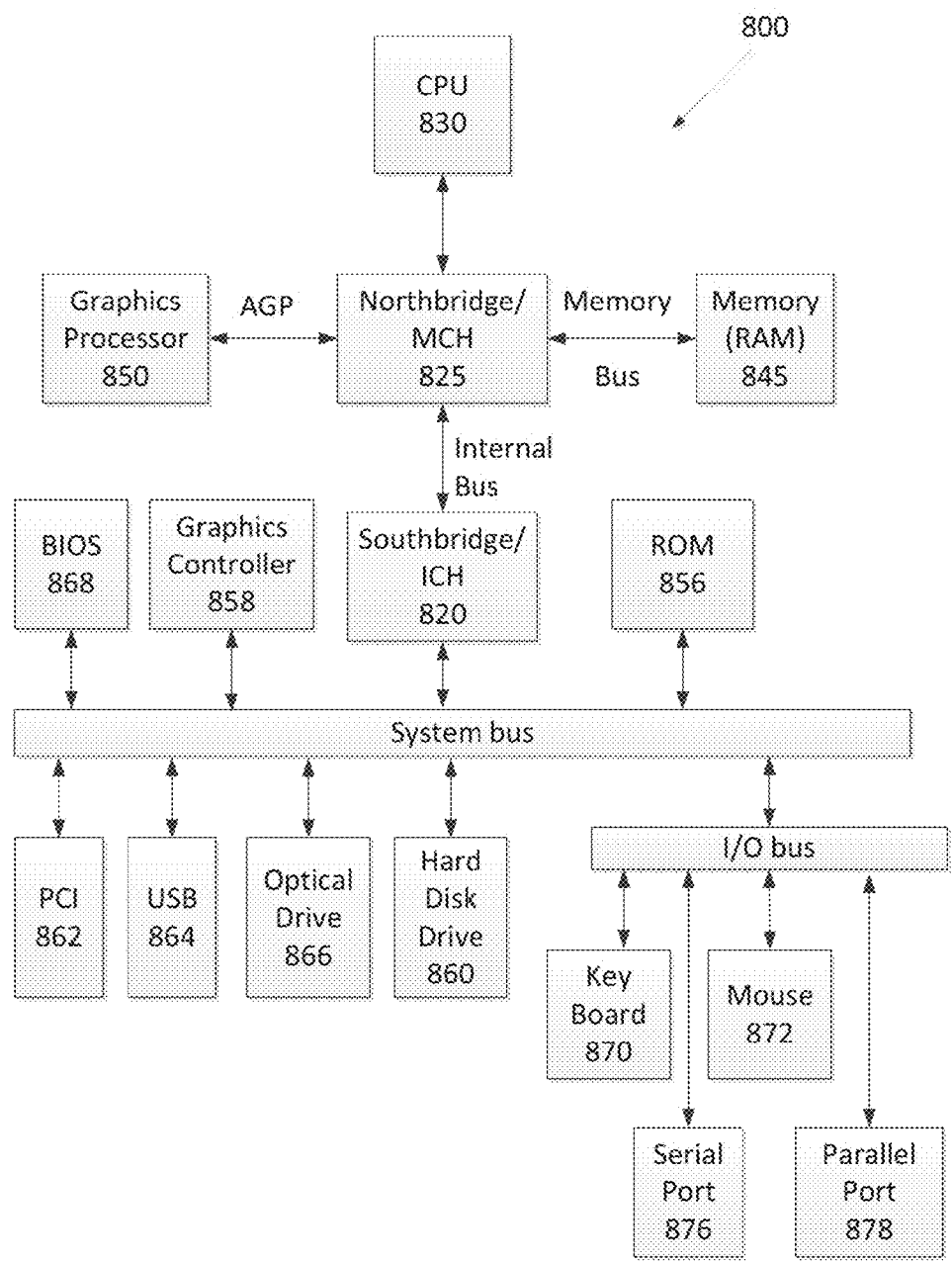
FIG. 8 is a block diagram of an exemplary data processing system according to an embodiment.

The exemplary circuit elements described in the context of the present disclosure can be replaced with other elements and structured differently than the examples provided herein. Moreover, circuitry configured to perform features described herein can be implemented in multiple circuit units (e.g., chips), or the features can be combined in circuitry on a single chipset, as shown in FIG. 8. The chipset of FIG. 8 can be implemented in conjunction with either electronic device 600 or computing device 700 described herein with reference to FIGS. 6 and 7, respectively.

FIG. 8 shows a schematic diagram of a data processing system, according to aspects of the disclosure described herein for performing a menu navigation. The data processing system is an example of a computer in which code or instructions implementing the processes of the illustrative embodiments can be located.

In FIG. 8, data processing system 800 employs an application architecture including a north bridge and memory controller application (NB/MCH) 825 and a south bridge and input/output (I/O) controller application (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU 830 can contain one or more processors and even can be implemented using one or more heterogeneous processor systems.

Figure 9:
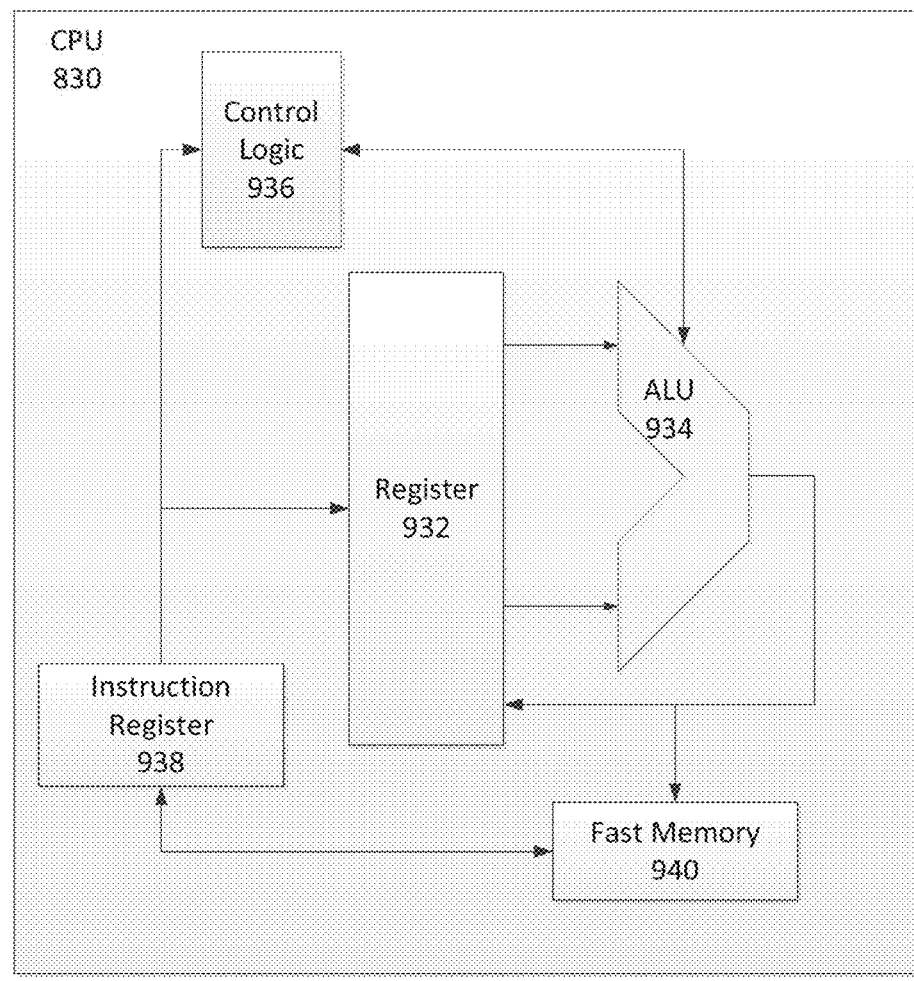
FIG. 9 is a block diagram of an exemplary CPU according to an embodiment.

For example, FIG. 9 shows one implementation of CPU 830. In one implementation, an instruction register 938 retrieves instructions from a fast memory 940. At least part of these instructions are fetched from an instruction register 938 by a control logic 936 and interpreted according to the instruction set architecture of the CPU 830. Part of the instructions can also be directed to a register 932. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using an arithmetic logic unit (ALU) 934 that loads values from the register 932 and performs logical and mathematical operations on the loaded values according to the instructions. The results from these operations can be fed back into the register 932 and/or stored in a fast memory 940.

According to aspects of the disclosure, the instruction set architecture of the CPU 830 can use a reduced instruction set computer (RISC), a complex instruction set computer (CISC), a vector processor architecture, or a very long instruction word (VLIW) architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor; a Power architecture processor by, e.g., IBM; a SPARC architecture processor by Sun Microsystems or by Oracle; or other known CPU architectures.

Referring again to FIG. 8, the data processing system 800 can include the SB/ICH 820 being coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 820 through a PCI bus 862.

The PCI devices can include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein can also be executed by various distributed components of a system. For example, one or more processors can execute these system functions, wherein the processors are distributed across multiple components communicating in a network. The distributed components can include one or more client and server machines, which can share processing, such as a cloud computing system, in addition to various human interface and communication devices (e.g., display monitors, smart phones, tablets, personal digital assistants (PDAs)). The network can be a private network, such as a LAN or WAN, or can be a public network, such as the Internet. Input to the system can be received via direct user input and received remotely either in real-time or as a batch process. Additionally, some implementations can be performed on modules or hardware not identical to those described. Accordingly, other implementations are within the scope that can be claimed.

The functions and features described herein may also be executed by various distributed components of a system. For example, one or more processors may execute these system functions, wherein the processors are distributed across multiple components communicating in a network. For example, distributed performance of the processing functions can be realized using grid computing or cloud computing. Many modalities of remote and distributed computing can be referred to under the umbrella of cloud computing, including: software as a service, platform as a service, data as a service, and infrastructure as a service. Cloud computing generally refers to processing performed at centralized locations and accessible to multiple users who interact with the centralized processing locations through individual terminals.

FIG. 10 illustrates an exemplary flowchart for a method according to aspects of the present disclosure. The hardware description above, exemplified by any one of the structural examples illustrated in FIG. 6, 7, or 8, constitutes or includes specialized corresponding structure that is programmed or configured to perform the method illustrated in FIG. 10. For example, the method illustrated in FIG. 10 may be completely performed by the circuitry included in the single device shown in FIG. 6 or 7, or the chipset as illustrated in FIG. 8. The method may also be completely performed in a shared manner distributed over the circuitry of any plurality of the devices.

FIG. 10 is an exemplary flowchart for a method 1000 of contextually rendering graphics. A graphics file is parsed into a plurality of graphics objects in step S1010. It is determined whether one or more dynamic behavior attributes are present for each graphics objects in step S1020. At least one tag name for each graphics object having the one or more dynamic behavior attributes is extracted in step S1030. An attribute weight is assigned to each of the dynamic behavior attributes in step S1040. A sum of the attribute weights for each tag name-graphics object combination is computed in step S1050. Each tag name-graphics object combination is ranked according to the respective computed sum, using circuitry in step S1060. A portion of a graphics view of one or more graphics objects for a first-ranked tag name-graphics object combination is displayed in context with other graphics objects in step S1070.

The above disclosure also encompasses the embodiments noted below.

(1) A contextual rendering system comprises circuitry configured to parse a graphics file into a plurality of graphics objects, determine whether one or more dynamic behavior attributes are present for each graphics object, extract at least one tag name for each graphics object having the one or more dynamic behavior attributes, assign an attribute weight to each dynamic behavior attribute, compute a sum of the attribute weights for each tag name-graphics object combination, rank each of the tag name-graphics object combinations according to the respective computed sum, and display a portion of a graphics view of one or more graphics objects for a first-ranked tag name-graphics object combination in context with other graphics objects.

(2) The contextual rendering system according to (1), wherein the circuitry is further configured to compute the sum of the attribute weights for each tag name-graphics object combination as Score_OT, sort the plurality of graphics objects based on their respective location and respective Score_OT for each tag name, and compute a combined score for each tag name-graphics file combination as a summation of all Score_OTs for an associated tag name.

(3) The contextual rendering system according to any of (1) through (2), wherein the circuitry is further configured to display the portion of the graphics view according to a display area size of a rendering device.

(4) The contextual rendering system according to any of (1) through (3), wherein the circuitry is further configured to render process graphics with real-time data for a real-time contextual view of the one or more graphics objects.

(5) The contextual rendering system according to any of (1) through (4), wherein the circuitry is further configured to provide a user navigation to other graphics objects associated with an area of interest.

(6) The contextual rendering system according to any of (1) through (5), wherein the circuitry is further configured to suppress displaying one or more graphics objects previously identified by a user.

(7) A method of contextually rendering graphics comprises parsing a graphics file into a plurality of graphics objects; determining whether one or more dynamic behavior attributes are present for each graphics object; extracting at least one tag name for each graphics object having the one or more dynamic behavior attributes; assigning an attribute weight to each of the dynamic behavior attributes; computing a sum of the attribute weights for each tag name-graphics object combination; ranking, using circuitry, each tag name-graphics object combination according to the respective computed sum; and displaying a portion of a graphics view of one or more graphics objects for a first-ranked tag name-graphics object combination in context with other graphics objects.

(8) The method according to (7), wherein the displaying includes identifying coordinates of a user's point of interest in proximity to the one or more graphics object, and displaying the one or more graphics objects in context with other graphics objects associated with one or more of the identified coordinates.

(9) The method according to any one of (7) through (8), wherein the displaying is contingent upon a display area size of a rendering device.

(10) The method according to any one of (7) through (9), further comprises transmitting a notification to a rendering device of an abnormality of interest, and rendering a contextual graphics display of the abnormality of interest to the rendering device.

(11) The method according to any one of (7) through (10), further comprises transmitting a notification to a rendering device of an abnormality of interest, and rendering a contextual graphics display of the abnormality of interest in context with one or more associated graphics features in proximity to the abnormality of interest to the rendering device.

(12) The method according to any one of (7) through (11), further comprises providing a user navigation to other graphics objects associated with an abnormality of interest.

(13) The method according to any one of (7) through (12), further comprises suppressing in the displaying, one or more of the graphics objects previously identified by a user.

(14) The method according to any one of (7) through (13), wherein the computing further comprises computing the sum of the attribute weights for each tag name-graphics object combinations as Score_OT, sorting the plurality of graphics objects based on their respective location and respective Score_OT for each tag name, and computing a combined score for each tag name-graphics file combination as a summation of all Score_OTs for an associated tag name.

(15) A non-transitory computer-readable storage medium having computer-executable instructions embodied thereon, that when executed by a computing device, executes a method comprising parsing a graphics file into a plurality of graphics objects; determining whether one or more dynamic behavior attributes are present for each graphics object; extracting at least one tag name for each graphics object having the one or more dynamic behavior attributes; assigning an attribute weight to each of the dynamic behavior attributes; computing a sum of the attribute weights for each tag name-graphics object combination; ranking each of the tag name-graphics object combinations according to the respective computed sum; and displaying a portion of a graphics view of one or more graphics objects for a first-ranked tag name-graphics object combination in context with other graphics objects.

(16) The non-transitory computer-readable storage medium according to (15), wherein the method further comprises computing the sum of the attribute weights for each tag name-graphics object combination as Score_OT, sorting the plurality of graphics objects based on their respective location and respective Score_OT for each tag name, and computing a combined score for each tag name-graphics file combination as a summation of all Score_OTs for an associated tag name.

(17) The non-transitory computer-readable storage medium according to any of (15) through (16), wherein the method further comprises displaying the portion of the graphics view according to a display area size of a rendering device.

(18) The non-transitory computer-readable storage medium according to any of (15) through (17), wherein the method further comprises rendering process graphics with real-time data for a real-time contextual view of the one or more graphics objects.

(19) The non-transitory computer-readable storage medium according to any of (15) through (18), wherein the method further comprises providing a user navigation to other graphics objects associated with an area of interest.

(20) The non-transitory computer-readable storage medium according to any of (15) through (19), wherein the method further comprises suppressing displaying one or more of the graphics objects previously identified by a user.

(21) A contextual rendering system comprises a graphics file repository configured to store graphics files, a graphics file analyzer configured with circuitry to analyze the graphics files and to compute an attribute-weighted score for one or more graphics objects for each of the graphics files based upon pre-defined rules, an analyzer repository configured to store calculated results of the graphics file analyzer, a graphics finder configured with circuitry to identify a graphics file for an associated tag name, and to sort one or more relevant graphics files, a contextual graphics view renderer configured with circuitry to display one or more relevant graphics objects on a device, and to update the displaying with real-time data, and a server configured with circuitry to process a graphics request from the device and forward the processed graphics request, via a request handler to the graphics finder.

(22) The contextual rendering system according to (21), wherein the graphics file analyzer is further configured with circuitry to compute a total attribute-weighted score for each graphics object-tag name combination as Score_OT, sort the one or more graphics objects based on their respective location and respective Score_OT for each tag name, and compute a combined score for each graphics file-tag name combination as a summation of all Score_OTs for an associated tag name.

(23) The contextual rendering system according to any one of (21) through (22), wherein the relative location includes a coordinate position of a particular graphics object within an associated graphics file.

(24) The contextual rendering system according to any one of (21) through (23), wherein the graphics finder is further configured with circuitry to sort and rank an identified graphics file-tag name combination within existing graphics file-tag name combinations in the analyzer repository.

(25) The contextual rendering system according to any one of (21) through (24), wherein the contextual graphics view renderer is further configured with circuitry to display a graphics view of an identified graphics object in context with existing ranked graphics objects within an associated graphics file.

(26) The contextual rendering system according to any one of (21) through (25), wherein a tag name is indexed with one or more of the graphics objects and a location of the respective one or more graphics objects to form a graphics object-tag name combination.

The foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the disclosure, including the claims. The disclosure, including any readily discernible variants of the teachings herein, defines in part, the scope of the foregoing claim terminology such that no inventive subject matter is dedicated to the public.

The invention claimed is:

1. A contextual rendering system, comprising:
   circuitry configured to
      parse at least one graphics file into a plurality of graphics objects;
      determine whether one or more dynamic behavior attributes are present for each graphics object;
      extract at least one tag name for each graphics object having the one or more dynamic behavior attributes;
      assign an attribute weight to each dynamic behavior attribute;
      compute a sum of the attribute weights for each tag name-graphics object combination based upon the attribute weight assigned to each dynamic behavior attribute;
      sort the attribute weight assigned to each dynamic behavior attribute by priority and location for each tag name-graphics object combination;
      compute a combined score for each tag name-graphics file combination as a summation of sums of the attribute weights for an associated tag name;
      display a portion of a graphics view of one or more graphics objects based on the combined scores in context with other graphics objects.

2. A contextual rendering system, comprising:
   circuitry configured to at least:
      parse at least one graphics file into a plurality of graphics objects;
      determine whether one or more dynamic behavior attributes are present for each graphics object;
      extract at least one tag name for each graphics object having the one or more dynamic behavior attributes;
      assign an attribute weight to each dynamic behavior attribute;
      compute a sum of the attribute weights for each tag name-graphics object combination as Score_OT;
      sort the plurality of graphics objects based on their respective location and respective Score_OT for each tag name; and
      compute a combined score for each tag name-graphics file combination as a summation of all Score_OTs for an associated tag name;
      rank each of the tag name-graphics file combinations according to the respective combined score; and
      display a portion of a graphics view of one or more graphics objects for a first-ranked tag name-graphics file combination in context with other graphics objects.

3. The contextual rendering system of claim 2, wherein the circuitry is further configured to:
   display the portion of the graphics view according to a display area size of a rendering device.

4. The contextual rendering system of claim 2, wherein the circuitry is further configured to:
   render process graphics with real-time data for a real-time contextual view of the one or more graphics objects.

5. The contextual rendering system of claim 2, wherein the circuitry is further configured to:
   provide a user navigation to other graphics objects associated with an area of interest.

6. The contextual rendering system of claim 2, wherein the circuitry is further configured to:
   suppress displaying one or more graphics objects previously identified by a user.

7. A method of contextually rendering graphics, the method comprising:
   parsing at least one graphics file into a plurality of graphics objects;
   determining whether one or more dynamic behavior attributes are present for each graphics object;
   extracting at least one tag name for each graphics object having the one or more dynamic behavior attributes;
   assigning an attribute weight to each of the dynamic behavior attributes;
   computing a sum of the attribute weights for each tag name-graphics object combination based upon the attribute weight assigned to each dynamic behavior attribute;
   sorting the attribute weight assigned to each dynamic behavior attribute by priority and location for each tag name-graphics object combination;
   compute a combined score for each tag name-graphics file combination as a summation of sums of the attribute weights for an associated tag name;
   and
   displaying a portion of a graphics view of one or more graphics objects based on the combined scores in context with other graphics objects.

8. A method of contextually rendering graphics, the method comprising:
   parsing at least one graphics file into a plurality of graphics objects;
   determining whether one or more dynamic behavior attributes are present for each graphics object;
   extracting at least one tag name for each graphics object having the one or more dynamic behavior attributes;
   assigning an attribute weight to each of the dynamic behavior attributes;
   computing a sum of the attribute weights for each tag name-graphics object combination as Score_OT;
   sorting the plurality of graphics objects based on their respective location and respective Score_OT for each tag name;
   computing a combined score for each tag name-graphics file combination as a summation of all Score_OTs for an associated tag name;
   ranking, using circuitry, each tag name-graphics file combination according to the respective combined score; and
   displaying a portion of a graphics view of one or more graphics objects for a first-ranked tag name-graphics file combination in context with other graphics objects.

9. The method of claim 8, wherein the displaying includes identifying coordinates of a user's point of interest in proximity to the one or more graphics objects, and displaying the one or more graphics objects in context with other graphics objects associated with one or more of the identified coordinates.

10. The method of claim 9, wherein the displaying is contingent upon a display area size of a rendering device.

11. The method of claim 8, further comprising:
   transmitting a notification to a rendering device of an abnormality of interest; and rendering a contextual graphics display of the abnormality of interest to the rendering device.

12. The method of claim 8, further comprising:
transmitting a notification to a rendering device of an abnormality of interest; and
rendering a contextual graphics display of the abnormality of interest in context with one or more associated graphics features in proximity to the abnormality of interest to the rendering device.

13. The method of claim 8, further comprising:
providing a user navigation to other graphics objects associated with an abnormality of interest.

14. The method of claim 8, further comprising:
suppressing in the displaying, one or more of the graphics objects previously identified by a user.

15. A non-transitory computer-readable storage medium having computer-executable instructions embodied thereon, that when executed by a computing device, executes a method comprising:
parsing at least one graphics file into a plurality of graphics objects;
determining whether one or more dynamic behavior attributes are present for each graphics object;
extracting at least one tag name for each graphics object having the one or more dynamic behavior attributes;
assigning an attribute weight to each of the dynamic behavior attributes;
computing a sum of the attribute weights for each tag name-graphics object combination based upon the attribute weight assigned to each dynamic behavior attribute;
sorting the attribute weight assigned to each dynamic behavior attribute by priority and location for each tag name-graphics object combination;
compute a combined score for each tag name-graphics file combination as a summation of sums of the attribute weights for an associated tag name; and
displaying a portion of a graphics view of one or more graphics objects based on the combined scores in context with other graphics objects.

16. A non-transitory computer-readable storage medium having computer-executable instructions embodied thereon, that when executed by a computing device, executes a method comprising:
parsing at least one graphics file into a plurality of graphics objects;
determining whether one or more dynamic behavior attributes are present for each graphics object;
extracting at least one tag name for each graphics object having the one or more dynamic behavior attributes;
assigning an attribute weight to each of the dynamic behavior attributes;
computing a sum of the attribute weights for each tag name-graphics object combination as Score_OT;
sorting the plurality of graphics objects based on their respective location and respective Score_OT for each tag name;
computing a combined score for each tag name-graphics file combination as a summation of all Score_OTs for an associated tag name;
ranking each of the tag name-graphics file combinations according to the respective combined score; and
displaying a portion of a graphics view of one or more graphics objects for a first-ranked tag name-graphics file combination in context with other graphics objects.

17. The non-transitory computer-readable storage medium of claim 16, wherein the method further comprises:
displaying the portion of the graphics view according to a display area size of a rendering device.

18. The non-transitory computer-readable storage medium of claim 16, wherein the method further comprises:
rendering process graphics with real-time data for a real-time contextual view of the one or more graphics objects.

19. The non-transitory computer-readable storage medium of claim 16, wherein the method further comprises:
providing a user navigation to other graphics objects associated with an area of interest.

20. The non-transitory computer-readable storage medium of claim 16, wherein the method further comprises:
suppressing displaying one or more of the graphics objects previously identified by a user.

* * * * *